US008504450B2

(12) United States Patent
Shastry (10) Patent No.: US 8,504,450 B2
(45) Date of Patent: Aug. 6, 2013

(54) MOBILE REMITTANCES/PAYMENTS (75) Inventor: Vishwanath Shastry, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 1493 days.

(21) Appl. No.: 11/848,745

(22) Filed: Aug. 31, 2007

(65) Prior Publication Data

US 2009/0061831 A1     Mar. 5, 2009

(51) Int. Cl.
*G06Q 40/00*     (2012.01)

(52) U.S. Cl.
USPC .......... 705/35; 705/41; 705/42; 705/43; 705/44; 705/45; 455/405

(58) Field of Classification Search
USPC .................. 455/405; 705/35, 41–45
See application file for complete search history.

(56) References Cited

U.S. PATENT DOCUMENTS

| | | | | |
|---|---|---|---|---|
| 6,029,150 | A * | 2/2000 | Kravitz | 705/39 |
| 6,142,369 | A * | 11/2000 | Jonstromer | 235/380 |
| 6,938,013 | B1 | 8/2005 | Gutierrez et al. | |
| 7,089,208 | B1 * | 8/2006 | Levchin et al. | 705/39 |
| 7,127,236 | B2 * | 10/2006 | Khan et al. | 455/414.1 |
| 7,139,694 | B2 * | 11/2006 | Horn et al. | 705/64 |
| 7,331,518 | B2 * | 2/2008 | Rable | 235/380 |
| 7,356,515 | B2 * | 4/2008 | Oppat et al. | 705/64 |
| 7,386,318 | B2 * | 6/2008 | Moon et al. | 455/456.3 |
| 7,578,434 | B2 | 8/2009 | Hansen et al. | |
| 7,983,970 | B1 | 7/2011 | Ostler et al. | |
| 8,214,293 | B2 * | 7/2012 | Powell | 705/44 |
| 8,407,121 | B2 * | 3/2013 | Paintin | 705/35 |
| 2002/0055852 | A1 * | 5/2002 | Little et al. | 705/1 |
| 2002/0152179 | A1 * | 10/2002 | Racov | 705/67 |
| 2003/0074310 | A1 | 4/2003 | Grovit et al. | |
| 2003/0167237 | A1 * | 9/2003 | Degen et al. | 705/64 |
| 2003/0171992 | A1 * | 9/2003 | Blagg et al. | 705/14 |
| 2003/0220835 | A1 * | 11/2003 | Barnes, Jr. | 705/14 |
| 2005/0065876 | A1 * | 3/2005 | Kumar | 705/39 |
| 2007/0063017 | A1 * | 3/2007 | Chen et al. | 235/379 |

(Continued)

FOREIGN PATENT DOCUMENTS

| KR | 20010091827 A | 10/2001 |
|---|---|---|
| KR | 20030012912 A | 2/2003 |

(Continued)

OTHER PUBLICATIONS

International Application Serial No. PCT/US2008/010278, Search Report mailed Feb. 9, 2009, 3 pgs.

(Continued)

*Primary Examiner* — Narayanswamy Subramanian
(74) *Attorney, Agent, or Firm* — Schwegman, Lundberg & Woessner, P.A.

(57) ABSTRACT

A method and a system for mobile remittance and/or payment are provided. Example embodiments may include receiving a request, at a financial entity and from a first party, to remit an amount from an account, associated with the first party to a mobile account associated with a phone number of a second party; notifying the second party of the amount to be remitted and an identity of the first party; receiving a personal identification component from the second party; accessing the mobile account based on the personal identification component; and depositing the amount into the mobile account. A request may be received from the second party to transfer a portion of the amount to a third party.

20 Claims, 9 Drawing Sheets

U.S. PATENT DOCUMENTS

| | | | | |
|---|---|---|---|---|
| 2007/0095892 | A1* | 5/2007 | Lyons et al. | 235/379 |
| 2007/0124224 | A1* | 5/2007 | Ayers et al. | 705/32 |
| 2007/0187484 | A1* | 8/2007 | Cooper et al. | 235/379 |
| 2007/0293202 | A1* | 12/2007 | Moshir et al. | 455/414.2 |
| 2008/0015989 | A1* | 1/2008 | Steiger | 705/44 |
| 2008/0052363 | A1* | 2/2008 | Pousti | 709/206 |
| 2008/0140548 | A1* | 6/2008 | Csoka | 705/30 |
| 2008/0257952 | A1* | 10/2008 | Zandonadi | 235/379 |
| 2008/0268811 | A1* | 10/2008 | Beenau et al. | 455/406 |
| 2008/0270300 | A1* | 10/2008 | Jones et al. | 705/41 |
| 2008/0270301 | A1* | 10/2008 | Jones et al. | 705/41 |
| 2009/0030846 | A1* | 1/2009 | Martinez-Miranda et al. | 705/72 |
| 2010/0145858 | A1 | 6/2010 | Milberger et al. | |
| 2011/0213671 | A1* | 9/2011 | Hirson et al. | 705/16 |
| 2012/0041877 | A1* | 2/2012 | Rao | 705/43 |
| 2012/0116967 | A1* | 5/2012 | Klein et al. | 705/42 |
| 2012/0173348 | A1* | 7/2012 | Yoo et al. | 705/16 |
| 2012/0259778 | A1* | 10/2012 | Banerjee et al. | 705/43 |
| 2013/0018785 | A1* | 1/2013 | Dolphin et al. | 705/40 |
| 2013/0024360 | A1* | 1/2013 | Ballout | 705/39 |
| 2013/0036000 | A1* | 2/2013 | Giordano et al. | 705/14.27 |

FOREIGN PATENT DOCUMENTS

| | | |
|---|---|---|
| KR | 100423401 B1 | 3/2004 |
| KR | 20060098024 A | 9/2006 |
| KR | 1020060098024 A | 9/2006 |
| WO | WO-2009032216 A1 | 3/2009 |

OTHER PUBLICATIONS

International Application Serial No. PCT/US2008/010278, Written Opinion mailed Feb. 9, 2009, 8 pgs.

Korean Application Serial No. 2010-7007040, Office Action mailed Oct. 24, 2011, 8 pgs.

Korean Application Serial No. 2010-7007040, Response filed Jul. 31, 2012 to Office Action mailed May 31, 2012, with English translation of claims, 15 pgs.

United Kingdom Application Serial No. 1004799.1, Office Action mailed Aug. 7, 2012, 4 pgs.

United Kingdom Application Serial No. 1004799.1, Response filed Jul. 23, 2012 to Office Action mailed Mar. 23, 2012, 13 pgs.

Chinese Application Serial No. 200880113718.4, Office Action mailed Sep. 4, 2012, with English translation of claims, 19 pgs.

British Application Serial No. 1004799.1, Office Action mailed Mar. 23, 2012, 2 pgs.

Indian Application Serial No. 1955/DELNP/2010, Voluntary Amendment filed Jul. 28, 2011, 4 pgs.

International Application Serial No. PCT/US2008/010278, International Preliminary Report on Patentability mailed Feb. 4, 2010, 12 pgs.

International Application Serial No. PCT/US2008010278, Demand filed May 11, 2009, 15 pgs.

Korean Application Serial No. 2010-7007040, Office Action mailed May 31, 2012, 12 pgs.

British Application Serial No. 1004799.1, Office Action mailed Aug. 23, 2011, 3 pgs.

Great Britain Application Serial No. GB1004799.1, Office Action Response filed Jan. 12, 2012, 4 pgs.

Korean Application Serial No. 2010-7007040, Response filed Nov. 29, 2011 to Office Action mailed Oct. 24, 2011, 29 pgs.

Chinese Application Serial No. 200880113718.4, Response filed Jan. 21, 2013 to Office Action mailed Sep. 4, 2012, 14 pgs.

Korean Application Serial No. 2010-7007040, Appeal Brief filed Mar. 21, 2013, 20 pgs.

Korean Application Serial No. 2010-7007040, Office Action mailed Dec. 31, 2012, 7 pgs.

United Kingdom Application Serial No. 1004799.1, Office Action mailed Dec. 6, 2012, 9 pgs.

\* cited by examiner

MOBILE REMITTANCES/PAYMENTS

TECHNICAL FIELD

Example embodiments relate generally to the technical field of mobile communication, and in one specific example, to a system for mobile remittances and/or payments.

BACKGROUND

Worldwide spread of mobile communication has changed the landscape of communication and affected numerous aspects of life, including commerce and entertainment. Due to their rapid deployment and low establishment cost, mobile communication networks have spread rapidly throughout the world, outstripping the growth of land lines. In many third world countries mobile phones are becoming available to more and more of less privileged groups of people who may lack access to personal fixed phones.

Today's mobile phones, in addition to the standard phone function, can support many additional services such as SMS (Short Message Service) for text messaging, email, packet switching for access to the Internet, and MMS (Multimedia Messaging Service) for communicating images and video data. Text messaging is now the most widely used mobile data service on the planet and has found applications far more than just inter-personal communication.

BRIEF DESCRIPTION OF THE DRAWINGS

Some embodiments are illustrated by way of example and not limitation in the figures of the accompanying drawings in which.

DETAILED DESCRIPTION

Example methods and systems for mobile remittances and/or payments have been described. In the following description, for purposes of explanation, numerous specific details are set forth in order to provide a thorough understanding of example embodiments. It will be evident, however, to one skilled in the art that the present invention may be practiced without these specific details.

For the purpose of present application, the term "agent" shall be taken to include, but not be limited to, a person or a machine (e.g. Automated Teller Machine (ATM)) that is capable of taking some kind of identification (e.g., driver license, passport, other valid identification cards, or biometric identification) to verify the identity of a customer.

For the purpose of present application, the term "mobile account" shall be taken to include, but not be limited to, an account associated with a mobile phone number. A mobile account may be distinguished from a normal account in many aspects including the way the account is opened, held and redeemed from.

For the purpose of present application, the term "normal account" shall be taken to include, but not be limited to, any account other than a mobile account.

Some embodiments described herein may include providing for a user to remit some amount from his/her account in a financial entity (e.g., PayPal, a subsidiary of eBay, San Jose, Calif.) to one or more mobile phone numbers associated with one or more second parties (e.g., persons who may or may not have any bank accounts). The second party may be notified of the amount and the identification of the remitting party. The second party may spend any part of the received amount by transferring to another account (e.g., second party's account or a third party's account in the financial entity or other financial institutions or banks), receiving cash in an agent or shopping at a vendor's business.

An example method may include receiving a request, at a financial entity and from a first party, to remit an amount (e.g., $100) from an account, associated with the first party, to a mobile account associated with a mobile phone number of a second party; and notifying (e.g., by calling or sending a message such as a text message) the second party of the amount to be remitted and an identity (e.g., name and phone number) of the first party.

In an example embodiment, the first party may use other financial institutions or agents, having an established banking relationship with the financial entity, to make a deposit into a first party's account in the financial entity or in a mobile phone number associated with the first party. The first party may receive a message (e.g., phone call or message such as text message or email) from the financial entity or any of the other financial institutions or agents whereat the deposit was made, confirming receipt of a deposit amount in the first party's account in the financial entity. The first party may then request to remit from the account associated with the first party any portion of the deposit amount to the mobile phone number associated with the second party. According to example embodiments, the request by the first party may be made to the financial entity by a phone call or email to the financial entity or online via the Internet.

According to example embodiments, the method may include receiving a personal identification component from the second party such as a personal identification number (PIN); accessing a mobile account associated with the mobile phone number based on the personal identification component; and depositing the amount into the mobile account. The method may include creating a new mobile account associated with the mobile phone number and correlating the new mobile account with a personal identification component received from the second party at the time of a first instance of remittance to the mobile phone number.

In an example embodiment, the financial entity may receive other information related to the second party (e.g., personal information such as name, address, phone number, etc.) and open a new normal account associated with the second party at the financial entity.

Example embodiments may include, accessing the account associated with the first party at the financial entity responsive to receiving the request from the first party and transferring an initial amount equal to the amount from the account associated with the first party to the mobile account. The transferring may include one or approaches including a funds transfer from a mobile account or a stored value associated with the first party, a funds transfer from a bank account associated with the first party, or a charge against a credit card account associated with the first party. According to an example embodiment, an agent may receive a payment from the first party for deposit into the account associated with the first party.

Example embodiments may include receiving a request from the second party to transfer at least a portion of the amount, remitted to the mobile account associated with the second party, to a third party. The transfer to the third party may include a fund transfer to a mobile account associated with the third party, a fund transfer to a bank account associated with the third party, or a cash transfer via an agent to the third party. The financial entity may identify the second party by an identification component before allowing the second party to transfer any portion of the amount.

According to an example embodiment, transferring by the first party may include using near field communication (NFC). Using NFC may include using a radio frequency identification (RFID) card. The RFID card may be installed in a mobile phone or a RFID reader. Another example of NFC may include using a Bluetooth (an industrial specification for wireless personal area networks) chip in the mobile phone to communicate with any Bluetooth enabled system (e.g., an ATM or another mobile device).

In an example embodiment, the financial entity may receive from the second party, a request to identify an agent from which the amount to be redeemed. The financial entity may send a message to the second party, the message informing the second party of a location of a selected agent.

According to an example embodiment, the financial entity may determine a geographic location of the second party, and identify the selected agent based on the selected agent being geographically proximate to the second party. The geographic location of the second party may be determined using information received from a mobile phone of the second party. For example, in some embodiments, the mobile phone of the second party may provide GPS information to define the geographic location of the second party.

Example embodiments may include transfers which include, providing free mobile service by crediting a mobile account of the second party with a remittance of service credits by the financial entity for a promotional period. After the promotional period, the financial entity may charge a transaction fee to an account associated with the first party at the remittance initiation time, or deduct the transaction fee from the amount before remitting to the second party.

Example System Architecture

Figure 1:
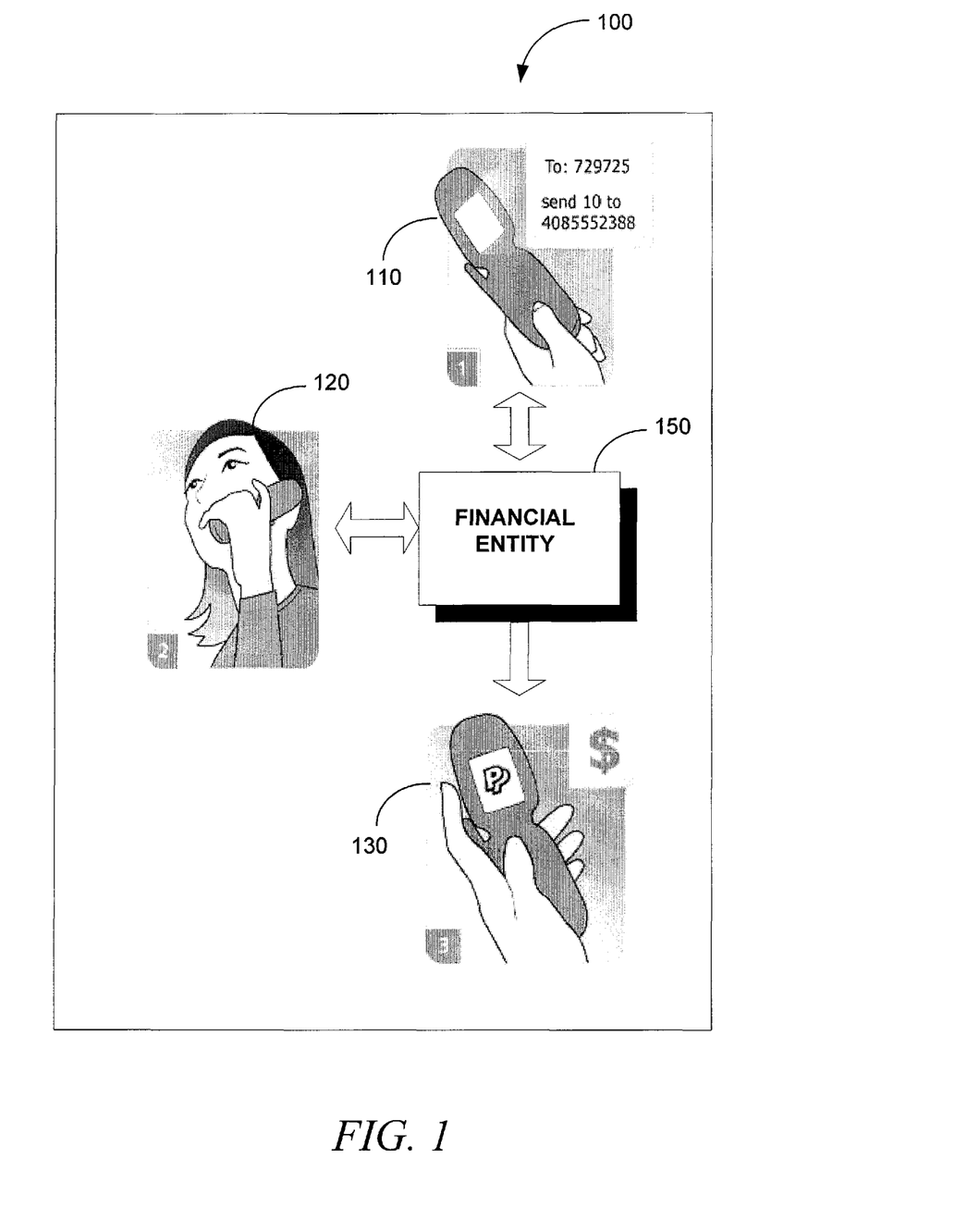
FIG. 1 is a high level diagram depicting an example embodiment of a method for mobile remittances and/or payments.

FIG. 1 is a high level diagram depicting an example embodiment of a method 100 for mobile remittances and/or payments. The method may involve a first party, a second party and a financial entity 150 (e.g., PayPal). At step 110 the first party may send a message (e.g., text message) to the financial entity 150 (e.g., to 729725) to send an amount (e.g. $10) to a mobile phone number (e.g., 408 5552388).

At step 120, a representative of the financial entity 150 may call the first party to confirm with the first party the first party's PIN. The representative may also request a confirmation of the amount and the mobile phone number of the second party. The representative may be an automated interactive voice (IVR) system. According to example embodiments an account associated with the first party (e.g., a stored value, a bank account, and a credit/debit account) may be debited or a gift certificate or other promotional value associated with the first party may be charged.

At step 130, the financial entity 150 may send a message (e.g., a text message) to the second party or call - the second party or send an email to the second party to notify the second party of the amount and the identity of the first party and, in case where the phone is not already activated for a mobile account in the financial entity 150 (e.g., PayPal mobile), to inform the second party of ways to spend the amount.

In an alternative example embodiment, the first party may visit a website associated with the financial entity 150 to login and complete a request form to initiate a remittance. After receiving the completed request form, the financial entity 150 may remit the amount to the second party and notify the second party of the remittance details (e.g., the amount, the identity of the first party, and inform the second party of ways to spend the amount, in case where the phone is not activated for a mobile account in the financial entity 150).

Figure 2:
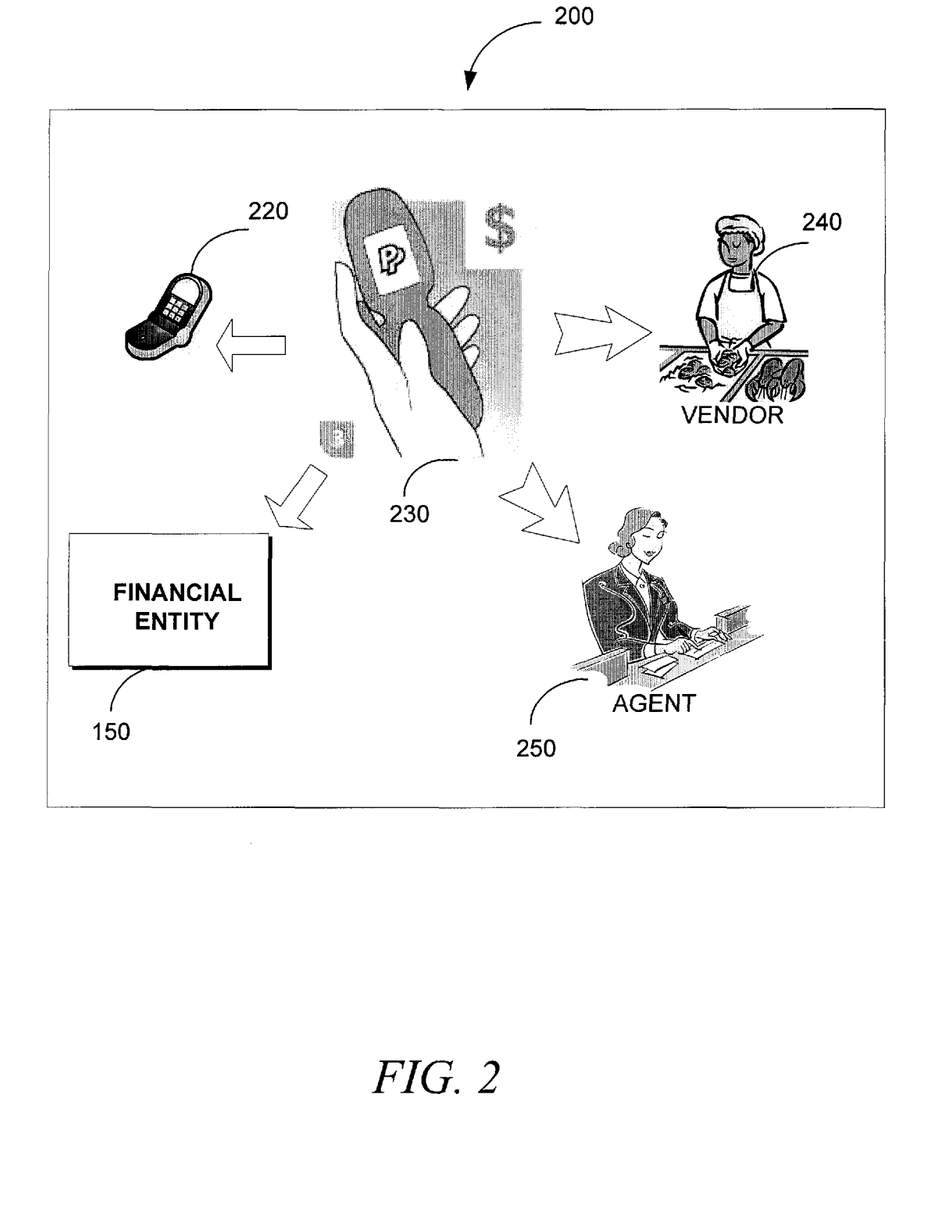
FIG. 2 is a high level diagram illustrating example embodiments of various spending channels available to a mobile account holder.

FIG. 2 is a high level diagram illustrating example embodiments of various spending channels 200 available to a mobile account holder. The second party 230, upon receipt of the amount from the financial entity 150 into his mobile account number, may spend any portion of the amount through various channels. The spending channels available to the second party may include transferring to another mobile phone number 220, transferring to the second party's account in the financial entity 150, transferring to a third party's account in the financial entity 150, or transferring to the second party's account at another financial entity (e.g. a local bank).

According to example embodiments, the second party 230 may spend any portion of the amount in his mobile account at an agent 250 by receiving cash at the agent 250 or transferring to an account in a financial institution (e.g. the financial entity 150, or any other financial institutions that may have established banking relation with the agent 250). Alternatively, the second party 230 may go to a vendor 240 to spend any portion of the amount in the mobile account number.

Figure 3:
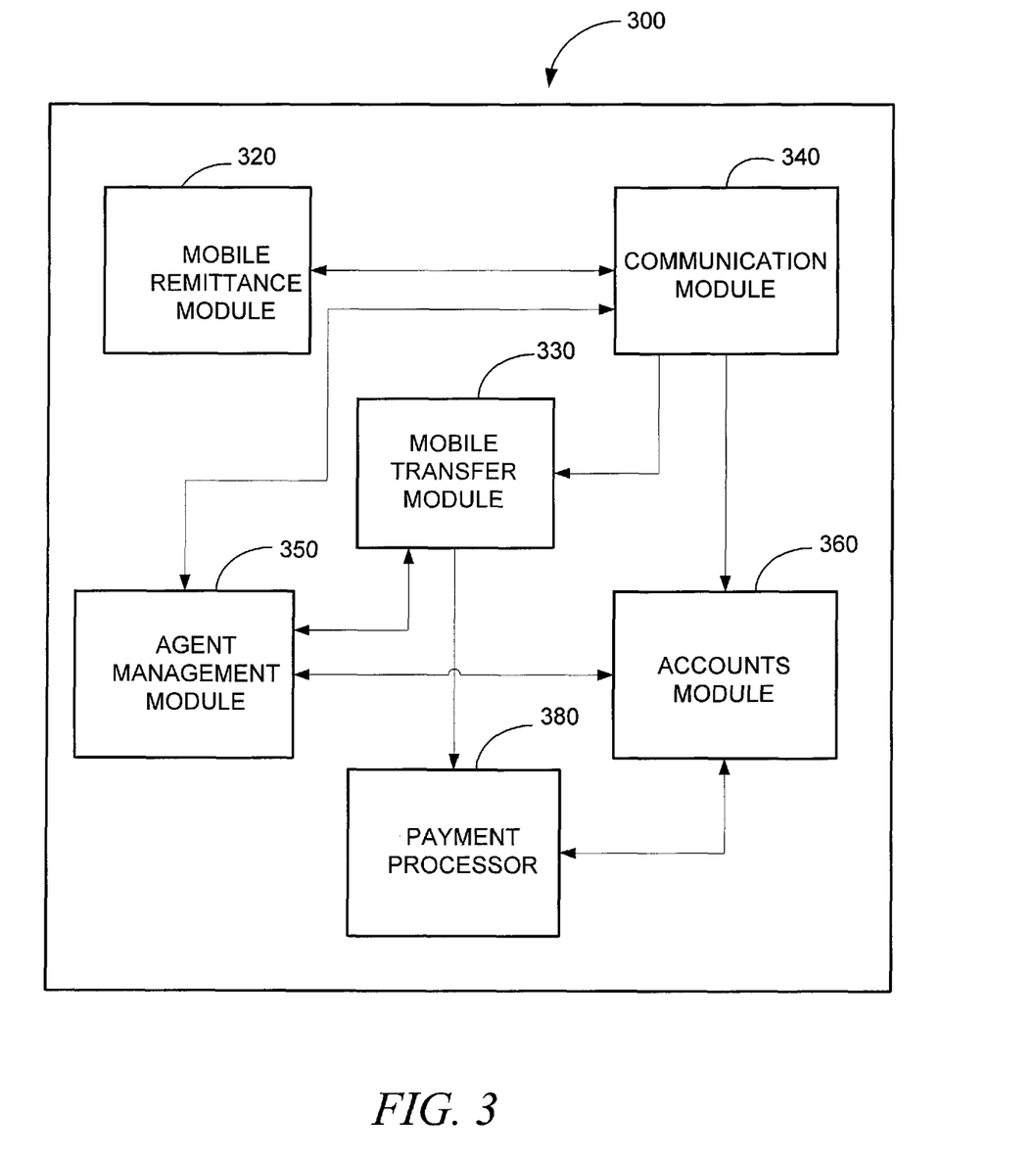
FIG. 3 is a block diagram illustrating an example embodiment of a system for mobile remittances and/or payments.

FIG. 3 is a block diagram illustrating an example embodiment of a system 300 for mobile remittances and/or payments. The mobile remittance system 300 may include a mobile remittance module 320, a communication module 340, a mobile transfer module 330, an agent management module 350, an accounts module 360 and a payment processor 380. The mobile remittance module 320 may receive, via the communication module 340, a request from the first party to remit an amount from an account associated with the first party, at the financial entity 150, to a mobile account associated with a mobile phone number of a second party.

In response, the mobile remittance module 320 may use the communication module 340 to notify the second party of the amount to be remitted and an identity of the first party. The communication module 340 may also receive a personal identification component from the second party and pass that to the accounts module 360. In an example embodiment, the communication module 340 may receive other information (e.g., personal information such as name, address, phone number, etc.) and pass it to the accounts module 360. The accounts module 360 may open a new account associated with the second party 230 at the financial entity 150. The account may be a normal account or a mobile account.

In case where it is the first instance of remittance to the mobile account number, the accounts module 360 may create a new account (e.g. mobile account) associated with the mobile phone number and may correlate the new account with the PIN. Otherwise, the accounts module 360 may access the mobile account associated with the mobile phone number based on the personal identification component and have the payment processor to deposit the amount into the mobile account.

In an example embodiment, the mobile remittance module 320 may access an account associated with the first party at the financial entity, responsive to receiving the request from the first party, and transfer an initial amount less than or equal to the amount from the account associated with the first party to the mobile account associated with the second party 230. The case where the initial amount is less than the amount may be related to situations including charging a transaction fee by the financial entity and reducing the remitted amount by an amount of the transaction fee.

In an example embodiment, the mobile transfer module 330 may receive a request from the second party to transfer at least a portion of the amount to a third party. According to an example embodiment, the mobile transfer module 330 may identify the second party with an identification component (e.g., PIN) before allowing the second party to transfer any portion of the amount.

The agent management module 350 may receive a payment made by the first party, at an agent, for deposit into the account associated with the first party. According to an example embodiment, the agent management module 350 may receive from the first party a request to identify an agent. The agent management module 350 may send a message (e.g., text message or e-mail) from the financial entity to the first party informing the first party of a location of a selected agent.

In an example embodiment, the agent management module 350 may receive from the second party a request to identify an agent whereat the received amount may be redeemed. The agent management module 350 may send a message from the financial entity to the second party 230 informing the first party of a location of a selected agent.

The agent management module 350 may determine a geographical location of a requesting party (e.g., the first party or the second party 230), requesting identification of an agent, and identify the selected agent based on the selected agent being geographically proximate to the requesting party. The agent management module 350 may determine the geographic location of the requesting party by using information received from a mobile phone of the requesting party.

Figure 4:
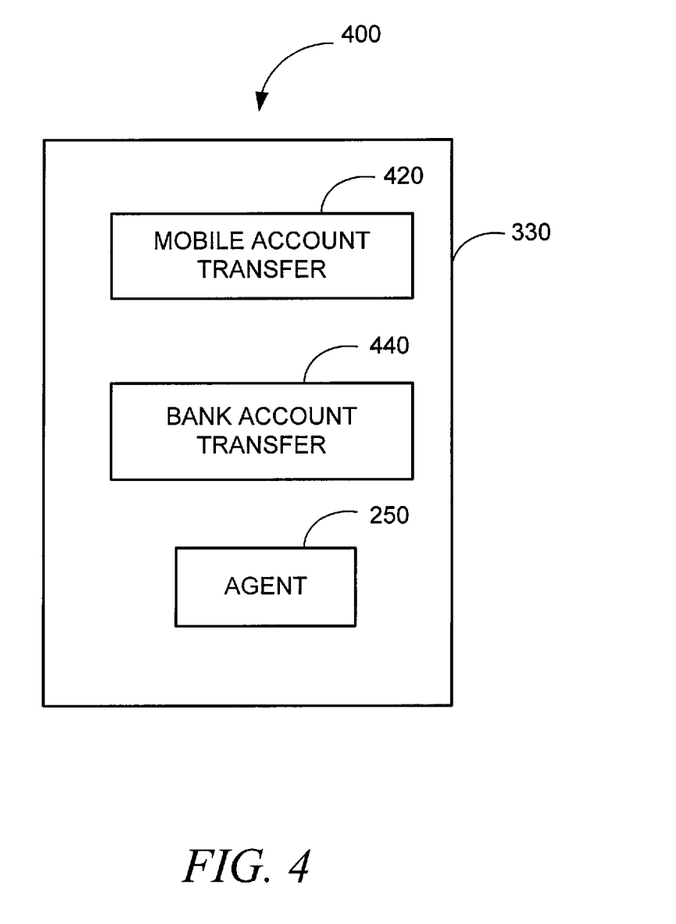
FIG. 4 is a block diagram depicting an example embodiment of a sub-module configuration of a mobile transfer module.

FIG. 4 is a block diagram depicting an example embodiment of a sub-module configuration of a mobile transfer module 330. The mobile transfer module 330 may include a mobile account transfer sub-module 420, a bank account transfer sub-module 440 and an agent 250. The mobile account transfer sub-module 420 may be used by the mobile transfer module 330 to transfer a fund from the mobile account associated with the second party to a mobile account associated with a third party.

According to an example embodiment, the bank account transfer sub-module 440 may be used by the mobile transfer module 330 to transfer a fund from the mobile account associated with the second party 230 to a bank account. The bank account may be associated with the second party 230 or the third party. In another example embodiment, the mobile transfer module 330 may use the agent 250 to perform a cash transfer to the third party.

Figure 5:
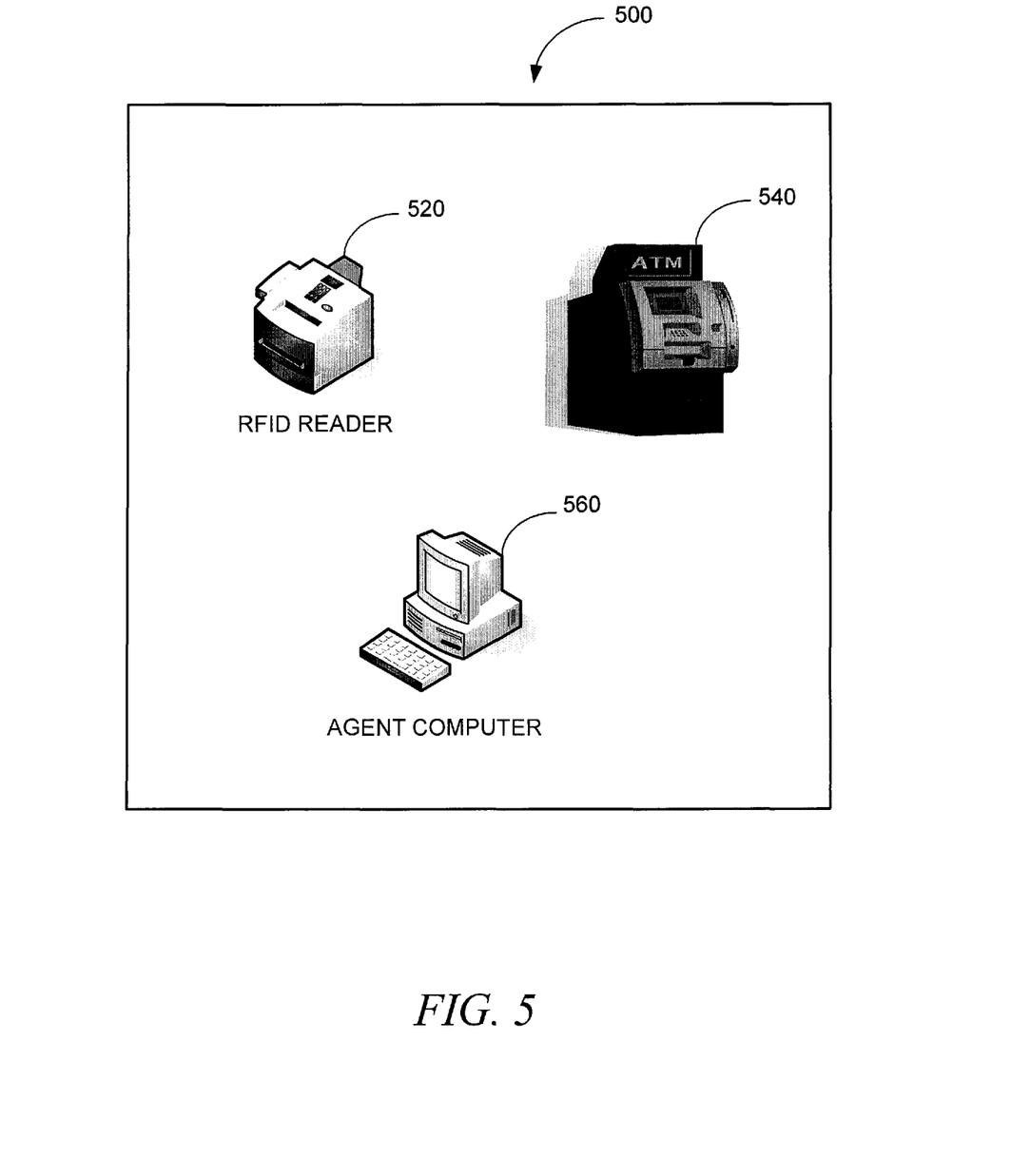
FIG. 5 is a diagram illustrating in an example embodiment various components of an agent.

FIG. 5 is a diagram illustrating in an example embodiment of various components 500 of an agent site. At a site used by the agent 250, there may be an agent computer 560, an RFID reader 520, or an ATM machine 540. The agent computer 560 may be used by a human agent or a site attendee (e.g., the second party or the first party) to perform the required cash transfer to/from a mobile account number or an account number at any institution, financially linked to the agent 250 (e.g., the financial entity 150).

In an example embodiment, a mobile phone (e.g., the mobile phone associated with the first/second party) may include an RFID card. In that case, the mobile phone user (e.g., the first/second party) may use the RFID reader 520 to perform a fund transfer.

In another example embodiment, the mobile phone user may use the ATM machine 540 to perform a fund transfer from his/her mobile account number. According to an example embodiment, mobile phone user may use the RFID reader 520 to communicate, via his mobile phone, to the ATM machine 540 or the agent computer 560.

Figure 6:
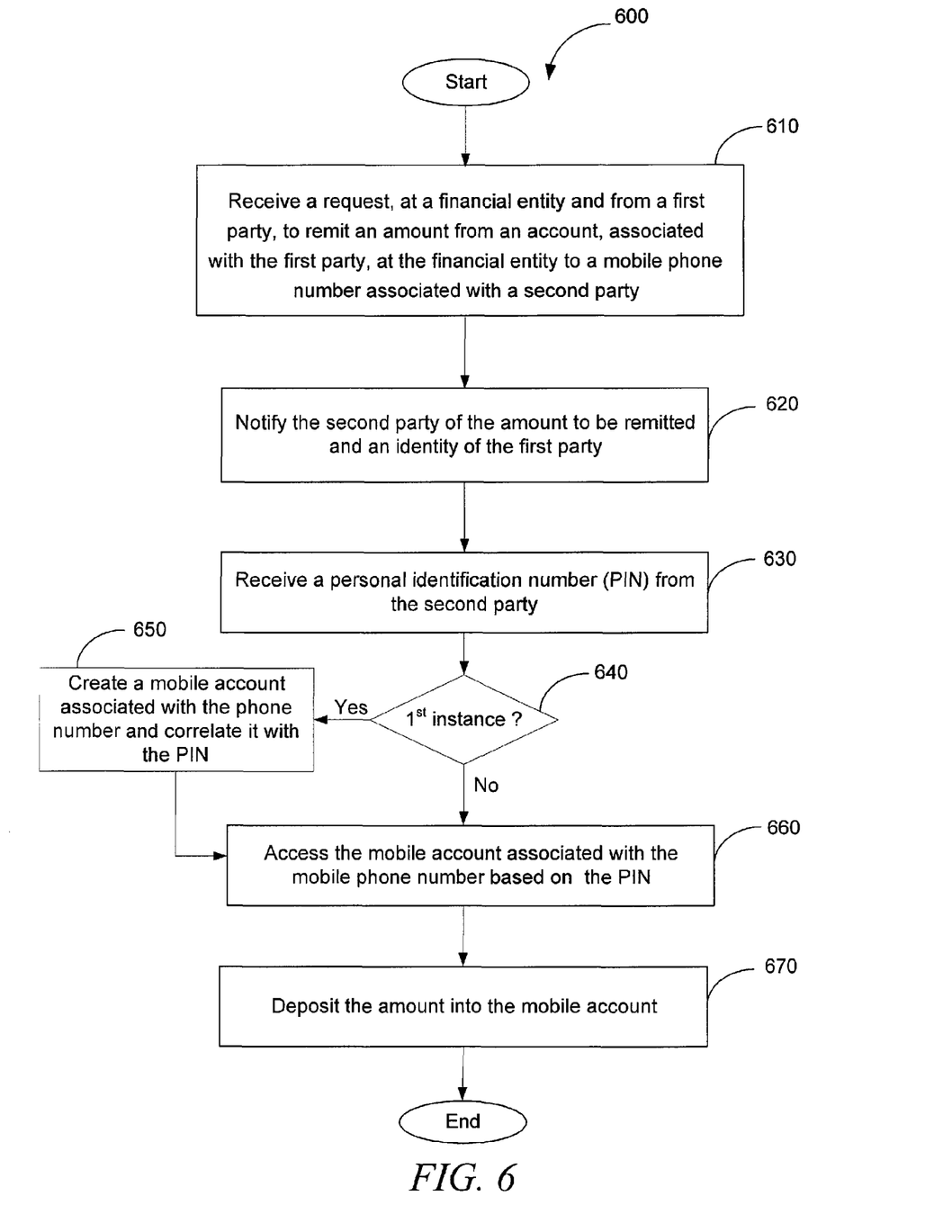
FIG. 6 is an example flow diagram illustrating a method for mobile remittances and/or payments.

FIG. 6 is an example flow diagram illustrating an example embodiment of a method 600 for mobile remittances and/or payments. The method 600 starts at operation 610, where the mobile remittance module 320 may receive, via the communication module 340, a request from a first party to remit an amount from an account associated with the first party at the financial entity 150 to a mobile phone number associated with the second party 230.

At operation 620, the communication module 340 may notify (e.g., using text messaging, or email) the second party 230 of the amount to be remitted and an identity of the first party remitting the amount. Following the notification, at operation 630, the communication module 340 may request and receive, from the second party, a personal identification component and transfer it to the accounts module 360. In an example embodiment, the personal identification component may include remote identification mechanisms such as biometric identification. The biometric identification may be employed using a biometric reader installed in the second party's phone.

At operation 640, after examining the mobile phone number, the accounts module 360 will determine if it is the first instance of remittance to that mobile account number. In case where it is established that it is the first instance of remittance to the mobile account number, the accounts module 360, at operation 650, may create a mobile account associated with the phone number and correlate that account with the received PIN. Otherwise, where it is determined that the mobile account has already been created, at operation 660, the accounts module 360 may access the mobile account associated with the mobile phone number based on the received PIN.

At operation 670, the accounts module 360 may request the payment processor 380 to deposit the amount into the mobile account of the second party.

Figure 7:
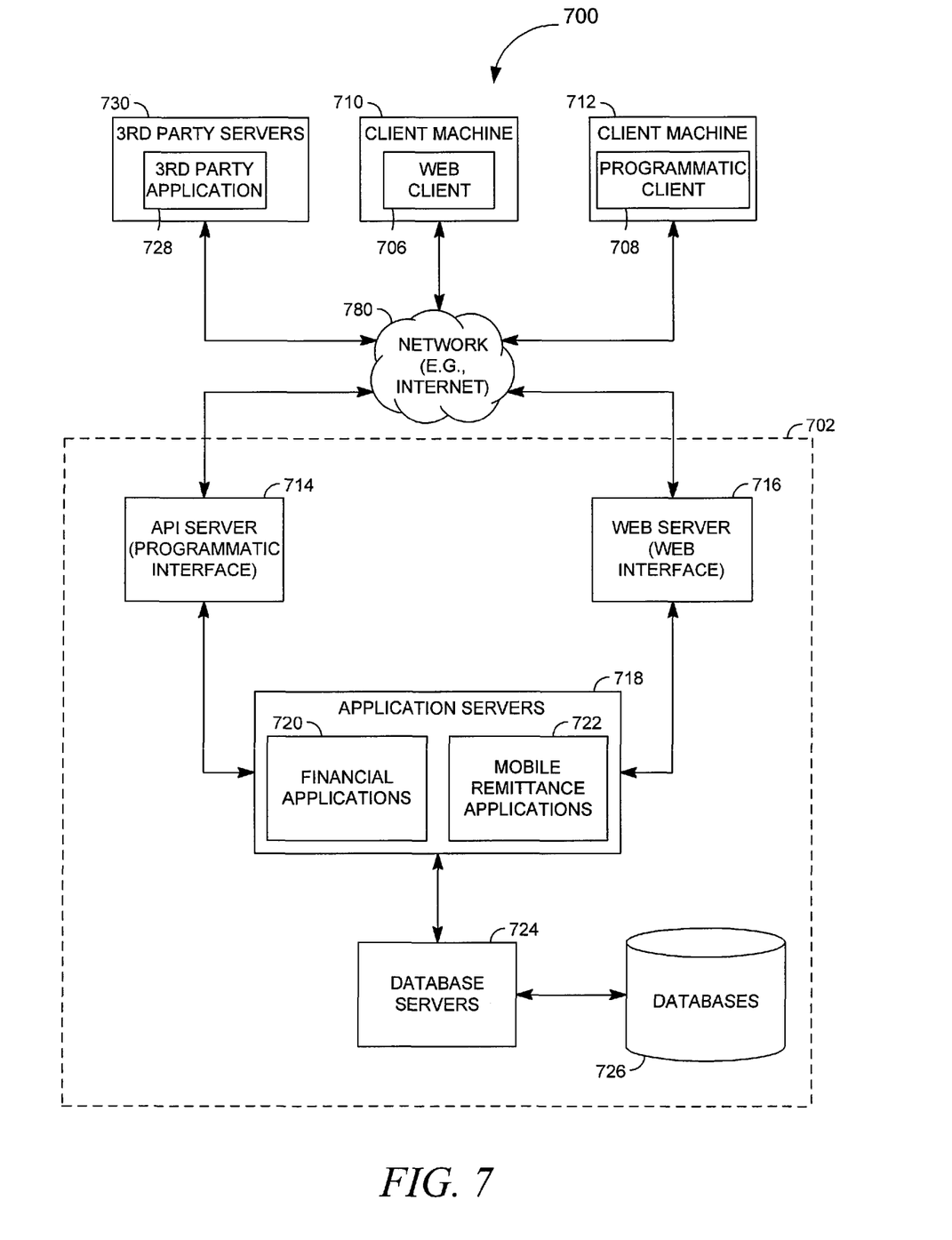
FIG. 7 is high level block diagram illustrating an example embodiment of a network-based mobile remittance system, having a client-server architecture, facilitating mobile remittances and/or payments.

FIG. 7 is a high-level block diagram illustrating an example embodiment of a network-based mobile remittance system 700, having a client-server architecture used for mobile remittance and/or payments. A financial platform, in the example form of a network-based financial system 702, provides server-side functionality, via a network 780 (e.g., the Internet) to one or more clients. FIG. 7 illustrates, for example, a web client 706 (e.g., a browser, such as the Internet Explorer browser developed by Microsoft Corporation of Redmond, Wash.), and a programmatic client 708 executing on respective client machines 710 and 712. In an example embodiment, either or both of the web client 706 and programmatic client 708 may include a mobile device.

Turning specifically to the network-based financial system 702, an Application Program Interface (API) server 714 and a web server 716 are coupled to, and provide programmatic and web interfaces respectively to, one or more application servers 718. The application servers 718 host one or more financial applications 720 and mobile remittance applications 722. The application servers 718 are, in turn, shown to be coupled to one or more database servers 724 that facilitate access to one or more databases 726.

The financial applications 720 provide a number of financial functions and services to users that access the network-based financial system 702. The mobile remittance applications 722 facilitate mobile remittance and/or payments to mobile accounts associated with mobile phone numbers.

Further, while the system 700 shown in FIG. 7 employs a client-server architecture, the present application is of course not limited to such an architecture, and could equally well find application in a distributed, or peer-to-peer, architecture system. The various financial and mobile remittance applications 720 and 722 may also be implemented as standalone software programs, which do not necessarily have networking capabilities.

The web client 706, it will be appreciated, may access the various financial and mobile remittance applications 720 and 722 via the web interface supported by the web server 716. Similarly, the programmatic client 708 accesses the various services and functions provided by the financial and mobile remittance applications 720 and 722 via the programmatic interface provided by the API server 714. The programmatic client 708 may, for example, be a remittance application to enable a user to authorize transfer of money from one or more of his/her accounts to one or more mobile phone numbers and to perform batch-mode communications between the programmatic client 708 and the network-based financial system 702.

FIG. 7 also illustrates a third party application 728, executing on a third party server machine 730, as having programmatic access to the network-based financial system 702 via the programmatic interface provided by the API server 714. For example, the third party application 728 may, utilizing information retrieved from the network-based financial system 702, support one or more features or functions on a website hosted by the third party. The third party website may, for example, provide one or more remittance or payment functions that are supported by the relevant applications of the network-based financial system 702.

Figure 8:
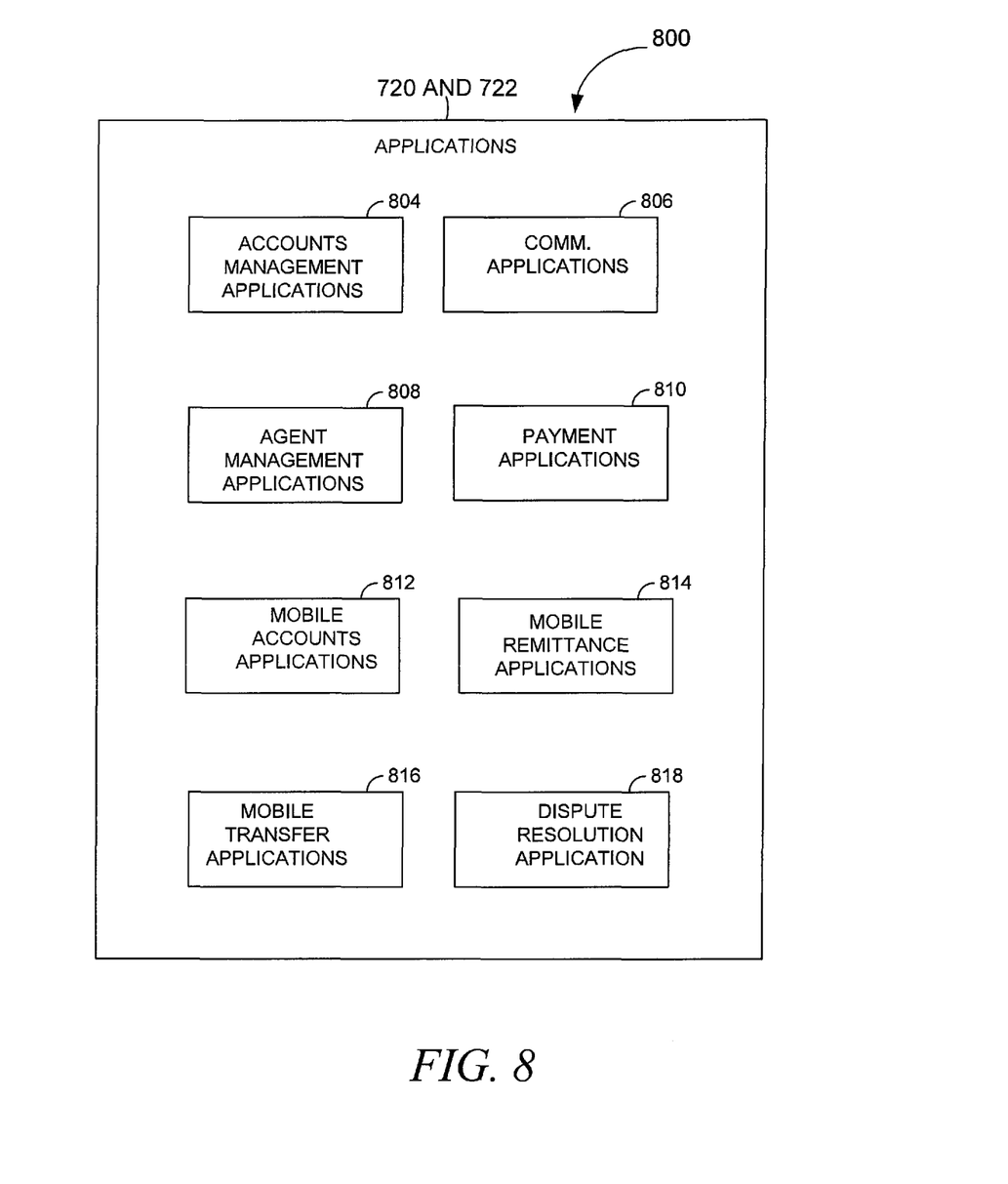
FIG. 8 is an example set of financial and educational applications used by the network-based financial system of FIG. 7.

FIG. 8 is a diagram illustrating multiple example financial and mobile remittance applications 800 that, in one example embodiment, are provided as part of the network-based financial system 702. The network-based financial system 702 may provide a number of remittance and payment mechanisms whereby a user may request a remittance from one or more of his/her accounts to a one or more mobile phones.

The financial applications 720 are shown to include one or more account management applications 804 which support and provide services related to various user accounts in a financial entity (e.g. PayPal). The various account management applications 804 may also provide a number of features such as supervising account transfers, holding account balances, and keeping tracking of and reporting transactions to relevant applications.

A number of communication applications 806 may support communication between the network-based financial system 702 and users' mobile phones. For example, the user who may utilize their mobile phones to communicate with the network-based financial system 702 and place their request for remittance from their accounts to one or more mobile phone numbers. In another example embodiment, the communication applications 806 may also facilitate communicating with mobile phone numbers to notify the owners of the mobile phone numbers of remittances from other parties to their mobile phone numbers. The communication applications 806 may support may support any other communication between the network-based financial system 702 and the outside world.

Agent management applications 808 may provide services to and support activities of agents 250 transacting with users. Users of the agents 250 may be the individuals holding account at the network-based financial system 702 who may use the agents 250 to remotely transact with the network-based financial system 702. In an example embodiment, the users may be mobile phone account holders who may want to spend the money received into their mobile phone accounts or transfer that money to other accounts (e.g., their accounts at the network-based financial system 702 or accounts associated with third parties at the network-based financial system 702 or other financial institutions networked with the agent 250.)

Payment applications 810 may support mobile remittance applications 814 to provide service to users requesting remittances form their accounts in the network-based financial system 702 to one or more mobile phone numbers associated with third parties. In other example embodiments, the payment applications may support to mobile transfer applications 816 to provide services to mobile phone account holders, in order to transfer money from their mobile phone accounts to other parties or their accounts in the network-based financial system 702.

As part of the mobile remittance applications 722, mobile accounts applications 812 may keep a list of all mobile phone accounts and respond to various requests, related to mobile phone accounts, made by the mobile remittance applications 814 and the mobile transfer applications 816.

The mobile remittance applications 814 may provide mechanisms whereby a user may remit money from his/her account in the network-based financial system 702 or any other financial institutions linked with the network-based financial system 702 to a mobile phone number associated with another party. In another example embodiment, the mobile remittance applications 814 may also support agents 250, via the agent management applications 808, to provide users with services to remit money from their accounts in the network-based financial system 702 or any other financial institutions linked with the network-based financial system 702 to a mobile phone number associated with another party.

The mobile transfer applications 816 may provide services to mobile phone account holders to spend money remitted to their accounts, by the mobile remittance applications 814, through transferring parts of the remitted money to one or more accounts associated with third parties in the network-based financial system 702 or any other financial institutions linked with the network-based financial system 702.

Dispute resolution applications 818 may provide mechanisms whereby disputes arising between transacting parties may be resolved. For example, the dispute resolution applications 818 may provide guided procedures whereby the parties are guided through a number of steps in an attempt to settle a dispute. In the event that the dispute cannot be settled via the guided procedures, the dispute may be escalated to a customer service agent for the financial system, third party mediator, or arbitrator.

Machine Architecture

Figure 9:
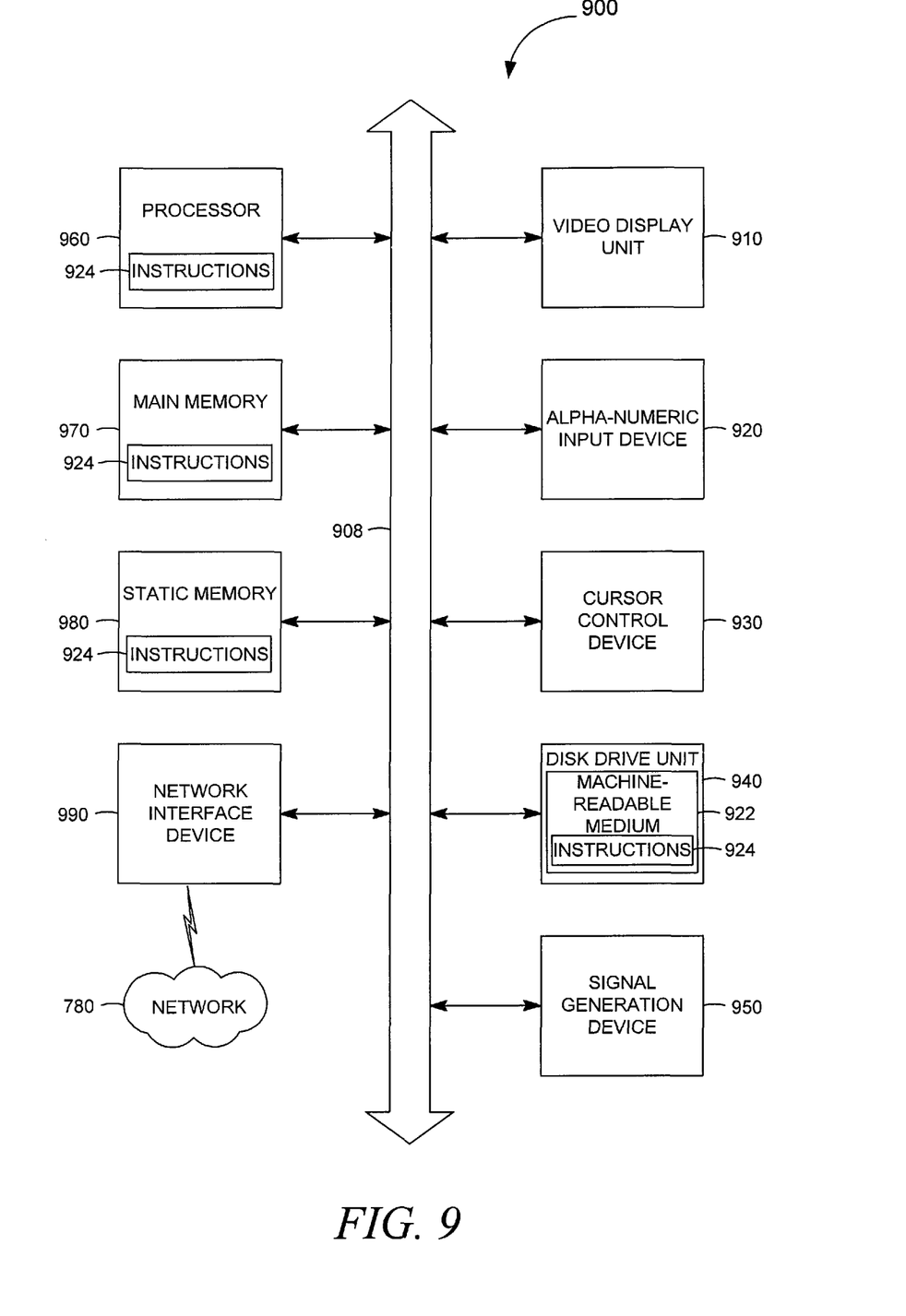
FIG. 9 is a block diagram illustrating a diagrammatic representation of a machine in the example form of a computer system.

FIG. 9 is a block diagram, illustrating a diagrammatic representation of machine 900 in the example form of a computer system within which a set of instructions for causing the machine to perform any one or more of the methodologies discussed herein may be executed. In alternative embodiments, the machine 900 may operate as a standalone device or may be connected (e.g., networked) to other machines. In a networked deployment, the machine 900 may operate in the capacity of a server or a client machine in a server-client network environment, or as a peer machine in a peer-to-peer (or distributed) network environment.

The machine 900 may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 960 (e.g., a central processing unit (CPU), a graphics processing unit (GPU) or both), a main memory 970 and a static memory 980, all of which communicate with each other via a bus 908. The computer system 900 may further include a video display unit 910 (e.g., liquid crystal displays (LCD) or cathode ray tube (CRT)). The computer system 900 also may include an alphanumeric input device 920 (e.g., a keyboard), a cursor control device 930 (e.g., a mouse), a disk drive unit 940, a signal generation device 950 (e.g., a speaker) and a network interface device 990.

The disk drive unit 940 may include a machine-readable medium 922 on which is stored one or more sets of instructions (e.g., software 924) embodying any one or more of the methodologies or functions described herein. The software 924 may also reside, completely or at least partially, within the main memory 970 and/or within the processor 960 during execution thereof by the computer system 900, the main memory 970 and the processor 960 also constituting machine-readable media.

The software 924 may further be transmitted or received over a network 780 via the network interface device 990.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Thus, a method and a system for mobile remittance and/or payments have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, via a network interface device, a request from a first party, who is a remittance requester, to a financial entity to transfer a remittance from an account at the financial entity, associated with the first party, to a mobile account associated with a mobile phone number of a mobile phone of a second party who is a remittance receiver;
   responsive to receiving the request, notifying the second party of the amount of the remittance and an identity of the first party;
   receiving, via the network interface device, a personal identification component from the second party, the personal identification component sent responsive to the notification;
   receiving, at the financial entity, from the second party, and responsive to the notification, a request to identify an agent from which the amount is to be redeemed, and, responsive to the request from the second party, sending a message from the financial entity to the second party, the message informing the second party of a location of a selected agent that is determined based on geographic information from the mobile phone;
   determining whether the remittance is a first instance of a remittance to the mobile phone number;
   responsive to the remittance being the first instance of a remittance to the mobile phone number, creating a new mobile account associated with the mobile phone number and correlating the new mobile account with the personal identification component:
   accessing the mobile account associated with the mobile phone number of the second party based on the personal identification component; and
   depositing the amount into the mobile account.

2. The method of claim 1, the notifying including calling the mobile phone number associated with the second party.

3. The method of claim 1, including accessing the account associated with the first party at the financial entity responsive to receiving the request and transferring an initial amount less than or equal to the amount from the account associated with the first party to the mobile account.

4. The method of claim 3, wherein the transferring includes at least one of:
   a fund transfer from a mobile account associated with the first party,
   a fund transfer from a bank account associated with the first party, or
   a charge against a credit card account associated with the first party.

5. The method of claim 4, the transferring by the first party including using at least one of a near field communication (NFC) or a Bluetooth device.

6. The method of claim 5, using NFC including using a radio frequency identification (RFID) card installed in a mobile phone and a RFID reader.

7. The method of claim 1, including receiving by an agent of a payment from the first party for deposit into the account associated with the first party.

8. The method of claim 1, including receiving a request from the second party to transfer at least a portion of the amount to a third party, the transfer to the third party including at least one of:
 a fund transfer to a mobile account associated with the third party,
 a fund transfer to a bank account associated with the third party, and
 a cash transfer via an agent to the third party.

9. The method of claim 8, including identifying the second party by a personal identification component before allowing the second party to transfer any portion of the amount.

10. The method of claim 1, the personal identification component including at least one of a personal identification number (PIN) or a biometric identification signature.

11. A system comprising:
 one or more computer processors; and
 computer storage coupled to the one or more computer processors,
  the one or more computer processors and the computer storage configured to execute,
   a mobile remittance module to receive, via a network interface device, a request from a first party who is a remittance requester to a financial entity to transfer a remittance from an account at the financial entity, associated with the first party, to a mobile account associated with a mobile phone number of a mobile phone of a second party who is a remittance receiver;
   a communication module to notify, based on receiving the request and via the network interface device, the second party of the amount of the remittance and an identity of the first party, the communication module to receive, via the network interface device, a personal identification component from the second party and responsive to the notification;
   an agent management module to receive, from the second party and responsive to the notification, via the network interface device, a request to identify an agent from which the amount is to be redeemed, and sending a message from the financial entity to the second party, the message informing the second party of a location of a selected agent that is determined based on geographic information from the mobile phone; and
   an accounts module responsive to a determination that the remittance is a first instance of a remittance to the mobile phone number, to create a new mobile account associated with the mobile phone number and correlate the new mobile account with the personal identification component, the accounts module to access the mobile account associated with the mobile phone number the accessing being responsive to receiving, and based on, the personal identification component, to have a payment processor deposit the amount into the mobile account.

12. The system of claim 11, the communication module being configured to notify the second party by calling the mobile phone number associated with the second party receiving the amount.

13. The system of claim 11, the mobile remittance module being configured to access the account associated with the first party at the financial entity responsive to receiving the request and to transfer an initial amount less than or equal to the amount from the account associated with the first party to the mobile account.

14. The system of claim 11, the accounts module being configured to identify the second party by an identification component before allowing the second party to transfer any portion of the amount.

15. The system of claim 11, the mobile transfer module including at least one of:
 a mobile account transfer sub-module to transfer a fund to a mobile account associated with the third party,
 a bank account transfer sub-module to transfer a fund to a bank account associated with the third party, and
 an agent to perform a cash transfer to the third party.

16. The system of claim 15, the mobile transfer module being configured to use near field communication (NFC), including a radio frequency identification (RFID) card installed in a mobile phone and a RFID reader.

17. The system of claim 11, the accounts module being configure to create a new mobile account associated with the mobile phone number and to correlate the new mobile account with the personal identification component, at a first instance of remittance to the mobile phone number.

18. The system of claim 11, the agent management module being configured to receive a payment made at an agent by the first party for deposit into the account associated with the first party.

19. A system comprising:
 means for receiving a request from a first party to a financial entity to transfer a remittance from an account at the financial entity, associated with the first party who is a remittance requester, to a mobile account associated with a mobile phone number of a mobile phone of a second party who is a remittance receiver;
 interface means for receiving and transmitting information,
 means responsive to receiving the request for notifying the second party of the amount of the remittance and an identity of the first party;
 means for receiving a personal identification component from the second party, the personal identification component sent by the second party responsive to the notification;
 means for receiving a request from the second party responsive to the notification to identify an agent from which the amount is to be redeemed;
 means, responsive to receiving the request, for transmitting the request from the second party to the financial entity;
 means for receiving a message from the financial entity identifying a location of the agent that is based on geographic information from the mobile phone, and sending the message to the second party;
 means, responsive to a determination that the remittance is the first instance of a remittance to the mobile phone number, for creating a new mobile account associated with the mobile phone number and correlating the new mobile account with the personal identification component;

means for accessing the mobile account associated with the mobile phone number, responsive to and based on the personal identification component; and means for depositing the amount into the mobile account.

20. A machine-readable hardware storage device having recorded therein instructions, which when implemented by one or more processors perform the following operations:

receiving a request, from a first (party who is a remittance requester to a financial entity to transfer a remittance from an account at the financial entity, associated with the first party, to a mobile account associated with a mobile phone number of a mobile phone of a second party who is a remittance receiver;

responsive to receiving the request, notifying the second party of the amount of the remittance and an identity of the first party;

receiving, at the financial entity, from the second party and responsive to the notification, a request to identify an agent from which the amount is to be redeemed, and sending a message from the financial entity to the second party, the message informing the second party of a location of a selected agent that is based on geographic information from the mobile phone, the request to identify an agent being sent responsive to the notification;

receiving a personal identification component that is sent from the second party responsive to the notification;

responsive to the remittance being the first instance of a remittance to the mobile phone number, creating a new mail account associated with the mobile phone number and correlating the new mobile account with the personal identification component;

accessing the mobile account responsive to receiving, and based on, the personal identification component; and depositing the amount into the mobile account.

* * * * *

UNITED STATES PATENT AND TRADEMARK OFFICE
CERTIFICATE OF CORRECTION

| | |
|---|---|
| PATENT NO. | : 8,504,450 B2 |
| APPLICATION NO. | : 11/848745 |
| DATED | : August 6, 2013 |
| INVENTOR(S) | : Vishwanath Shastry |

It is certified that error appears in the above-identified patent and that said Letters Patent is hereby corrected as shown below:

In the Claims

In column 10, line 48, in Claim 1, delete "component:" and insert --component;--, therefor In column 13, line 8, in Claim 20, delete "(party" and insert --party--, therefor In column 14, line 11, in Claim 20, delete "mail" and insert --mobile--, therefor Signed and Sealed this
Twenty-seventh Day of October, 2015

Michelle K. Lee
*Director of the United States Patent and Trademark Office*